(12) United States Patent
Takenaga et al.

(10) Patent No.: US 11,906,048 B2
(45) Date of Patent: Feb. 20, 2024

(54) SEALING STRUCTURE AND METHOD OF MANUFACTURING THE SAME

(71) Applicants: TOYOTA JIDOSHA KABUSHIKI KAISHA, Toyota (JP); Newfrey LLC, New Britain, CT (US)

(72) Inventors: Tomohiro Takenaga, Seto (JP); Keisuke Uchida, Nagoya (JP); Tatsuya Okamoto, Toyota (JP); Satoru Ando, Nagoya (JP); Toshio Narita, Toyohashi (JP); Hiroshi Imaizumi, Toyohashi (JP); Naoki Yamaguchi, Toyohashi (JP)

(73) Assignees: TOYOTA JIDOSHA KABUSHIKI KAISHA, Toyota (JP); Newfrey LLC, New Britain, CT (US)

(*) Notice: Subject to any disclaimer, the term of this patent is extended or adjusted under 35 U.S.C. 154(b) by 62 days.

(21) Appl. No.: 17/720,666

(22) Filed: Apr. 14, 2022

(65) Prior Publication Data
US 2022/0364644 A1 Nov. 17, 2022

(30) Foreign Application Priority Data
May 14, 2021 (JP) .................................. 2021-082210

(51) Int. Cl.
*F16J 15/04* (2006.01)
*F16J 15/02* (2006.01)

(52) U.S. Cl.
CPC .............. *F16J 15/04* (2013.01); *F16J 15/021* (2013.01)

(58) Field of Classification Search
CPC .............. F16J 15/04; F16J 15/02; F16J 15/028
See application file for complete search history.

(56) References Cited

U.S. PATENT DOCUMENTS

| 2,701,615 A * | 2/1955 | Riordan, Jr. ........ E21B 33/1208 277/331 |
| RE32,831 E * | 1/1989 | Shonrock ............ E21B 33/1293 166/135 |
| 7,047,619 B2 * | 5/2006 | Wambold ............ B25B 27/0028 100/9 |
| 2011/0062672 A1 * | 3/2011 | Baumann ................. F16J 15/52 277/510 |
| 2013/0147121 A1 * | 6/2013 | Xu ........................ E21B 33/128 277/337 |

FOREIGN PATENT DOCUMENTS

| JP | 2011-252514 A | 12/2011 |
| JP | 2014-175143 A | 9/2014 |
| JP | 2019-051978 A | 4/2019 |

* cited by examiner

*Primary Examiner* — Gilbert Y Lee
(74) *Attorney, Agent, or Firm* — Sughrue Mion, PLLC

(57) ABSTRACT

A sufficient sealing property of a through hole is ensured. A sealing structure includes a cylindrically-shaped body part inserted into the through hole, formed of a thin plate of a first thickness, one end of the body part being open and another end of the body part being closed, a tapered part connected to the opened one end of the body part and including a diameter gradually expanding outward as a distance from the body part increases, and a first bent part connected to the tapered part, formed of a thin plate thinner than the first thickness, and bent inward so that a protruding part protruding outward elastically abuts against an inner peripheral surface of the through hole.

7 Claims, 9 Drawing Sheets

SEALING STRUCTURE AND METHOD OF MANUFACTURING THE SAME

CROSS REFERENCE TO RELATED APPLICATIONS

This application is based upon and claims the benefit of priority from Japanese patent application No. 2021-082210, filed on May 14, 2021, the disclosure of which is incorporated herein in its entirety by reference.

BACKGROUND

The present disclosure relates to a sealing structure for sealing a through hole and a method of manufacturing the same.

A sealing structure for sealing a through hole with a plug is known (for example, see Japanese Unexamined Patent Application Publication No. 2011-252514).

SUMMARY

In the above sealing structure, when an internal pressure is applied to the plug, the plug may come out and a sealing property of the through hole may not be ensured.

The present disclosure has been made to solve such a problem, and a main object of the present disclosure is to provide a sealing structure capable of ensuring sufficient sealing property of a through hole, and a method of manufacturing the sealing structure.

In an example aspect of the present disclosure to achieve the above object, a sealing structure for sealing a through hole of a predetermined member including: a cylindrically-shaped body part inserted into the through hole, formed of a thin plate of a first thickness, one end of the body part being open and another end of the body part being closed;

a tapered part connected to the opened one end of the body part and including a diameter gradually expanding outward as a distance from the body part increases; and a first bent part connected to the tapered part, formed of a thin plate thinner than the first thickness, and bent inward so that a protruding part protruding outward elastically abuts against an inner peripheral surface of the through hole.

In this example aspect, a second bent part connected to the first bent part, formed of a thin plate thinner than the first thickness, and bent outward so that a distal end part elastically abuts against the inner peripheral surface of the through hole may be further included.

In this example aspect, a recessed notch may be formed on the inner peripheral surface of the through hole, and at least one of the protruding part of the first bent part and the distal end part of the second bent part may be fitted into the notch.

In this example aspect, a thickness of the distal end part of the second bent part may be greater than a thickness of the protruding part of the first bent part, or the distal end part of the second bent part may be tapered so that its diameter expands outward.

In this example aspect, female threads engaged with male threads formed in a pulling jig for pulling the body part in an axial direction may be formed on the inner peripheral surface of the body part.

In another example aspect of the present disclosure for achieving the above object, a method of manufacturing a sealing structure for sealing a through hole of a predetermined member may include:

inserting a sealing member into the through hole, the sealing member including a cylindrically-shaped body part formed of a thin plate of a first thickness, one end of the body part being open and another end of the body part being closed, a tapered part with one end connected to the opened one end of the body part and including a diameter gradually expanding outward as a distance from the body part increases, and a cylindrical part connected to another end of the tapered part and including a cylindrical shape formed of a thin plate thinner than the first thickness;

disposing a pressing jig on a distal end side of the cylindrical part in the through hole; and pressing a distal end of the cylindrical part by the pressing jig while pressing or pulling the body part toward the cylindrical part to thereby buckle the cylindrical part outward and make the protruding part protruding outward elastically abut against an inner peripheral surface of the through hole.

In this example aspect, the distal end of the cylindrical part may be pressed by pressing or pulling the body part toward the cylindrical part and making the distal end of the cylindrical part abut against the pressing jig.

In this example aspect, the pressing jig may be disposed so that the distal end of the cylindrical part is pressed against the inner peripheral surface of the through hole by the pressing jig, and by pressing or pulling the body part toward the cylindrical part, the cylindrical part may be buckled outward, and the protruding part of the first bent part protruding outward may elastically abut against the inner peripheral surface of the through hole, and a distal end side of the first bent part may be bent outward to form a second bent part.

In this example aspect, male threads of a pulling jig may be screwed into female threads formed on the inner peripheral surface of the body part, or the pulling jig may be hooked on a recess or projection formed on the inner peripheral surface of the body part, and by pressing the distal end of the cylindrical part by the pressing jig while pulling the pulling jig, the cylindrical part may be buckled outward and the protruding part protruding outward may elastically abut against the inner peripheral surface of the through hole.

According to the present disclosure, it is possible to provide a sealing structure capable of ensuring a sufficient sealing property of a through hole, and a method of manufacturing the sealing structure.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
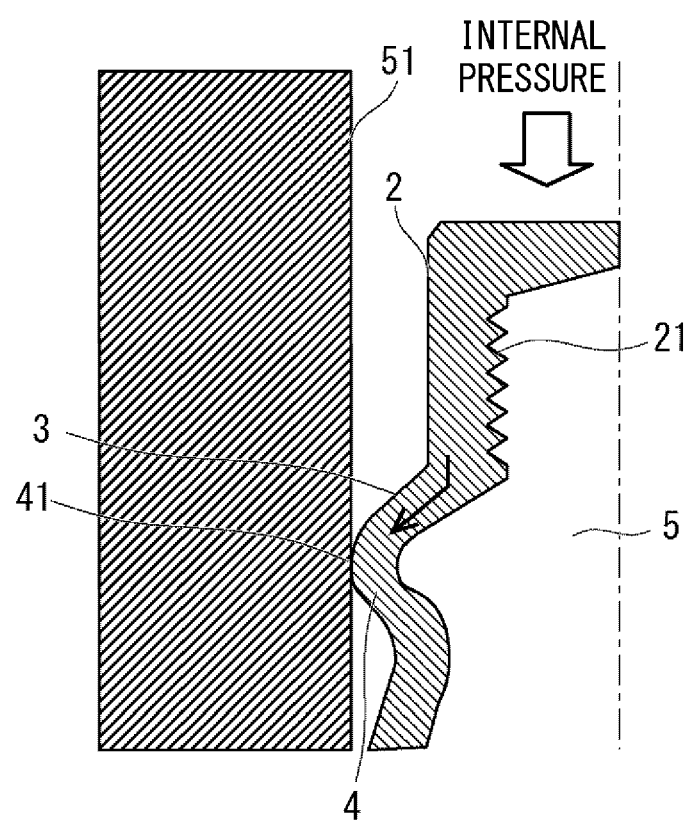
FIG. 1 is a cross-sectional view showing a configuration of a sealing structure according to a first embodiment.

Embodiments of the present disclosure will be described below with reference to the drawings. FIG. 1 is a cross-sectional view showing a structure of a sealing structure according to a first embodiment. In FIG. 1 and FIGS. 2 to 9, which will be described later, only the left side parts of sealing structures 1 and 20 are shown to facilitate understanding of the structure. The right side parts of the sealing structures 1 and 20 have a shape symmetrical to the left side parts thereof about a center axis line.

The sealing structure 1 according to the first embodiment seals a predetermined number of through holes 5 such as lubricating holes of a transaxle case.

The sealing structure 1 according to the first embodiment includes a body part 2, a tapered part 3 connected to the body part 2, and a first bent part 4 connected to the tapered part 3. The body part 2, the tapered part 3, and the first bent part 4 are integrally formed of metal. The body part 2, the tapered part 3, and the first bent part 4 are formed of, for example, stainless steel such as SUS 410. A member such as a case constituting the through hole 5 is formed of an aluminum alloy such as ADC 12.

The body part 2 is a member having a cylindrical shape inserted into the through hole 5 and formed of a thin plate of a first thickness. One end of the cylindrical shape is open while the other end of the cylindrical shape is closed. Female threads 21 with which male threads of a pulling jig described later engage may be formed on an inner peripheral surface of the body part 2.

One end of the tapered part 3 is connected to the opened one end of the body part 2. A diameter of the tapered part 3 gradually expands outward as a distance from the body part 2 increases. The tapered part 3 is formed of a thin plate which gradually becomes thinner as a distance from the body part 2 increases.

The first bent part 4 is connected to the other end of the tapered part 3. The first bent part 4 is formed of a thin plate thinner than the first thickness. The first bent part 4 has a protruding part 41 which is bent inward (toward a central axis) so that the protruding part 41 protrudes outward (toward an inner peripheral surface 51 of the through hole 5). The protruding part 41 elastically abuts against the inner peripheral surface 51 of the through hole 5.

In related art, for example, when a pressure is applied to a plug for closing a through hole, there has been a problem that the plug comes out and a sealing property of the through hole cannot be ensured.

On the other hand, in the sealing structure 1 according to the first embodiment, as described above, the protruding part 41 of the first bent part 4, which is connected to the tapered part 3 and formed of a thin plate thinner than the first thickness and protrudes outward by being bent inward, elastically abuts against the inner peripheral surface 51 of the through hole 5.

In this way, the protruding part 41 of the first bent part 4 elastically abuts against the inner peripheral surface 51 of the through hole 5, thereby preventing the sealing structure 1 from coming out of the through hole 5. Thus, the sealing property of the through hole 5 can be sufficiently ensured. Further, since the protruding part 41 of the first bent part 4 elastically abuts against the inner peripheral surface 51 of the through hole 5 to close the through hole 5, there is no influence of a tolerance of the through hole 5.

Figure 2:
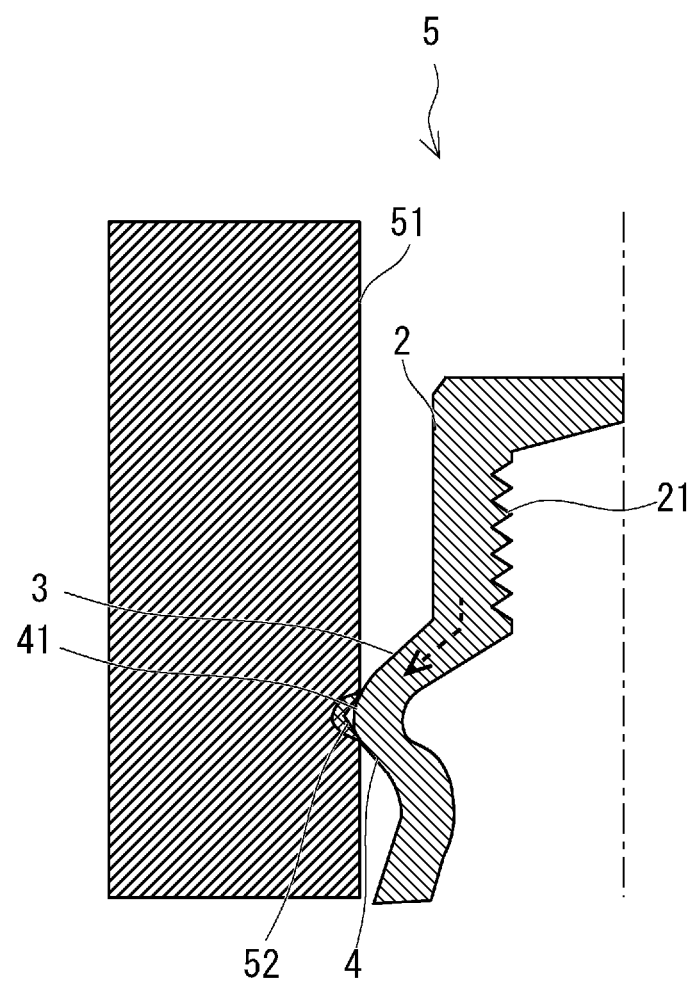
FIG. 2 shows a notch formed on an inner peripheral surface of a through hole.

On the inner peripheral surface 51 of the through hole 5, as shown in FIG. 2, a recessed notch 52 may be formed at a part where the protruding part 41 of the first bent part 4 abuts. The notch 52 is formed in a groove shape in a circumferential direction on the inner peripheral surface 51 of the through hole 5. The protruding part 41 of the first bent part 4 is fitted into the notch 52. Thus, the sealing structure 1 can be more surely prevented from coming out of the through hole 5.

Figure 3:
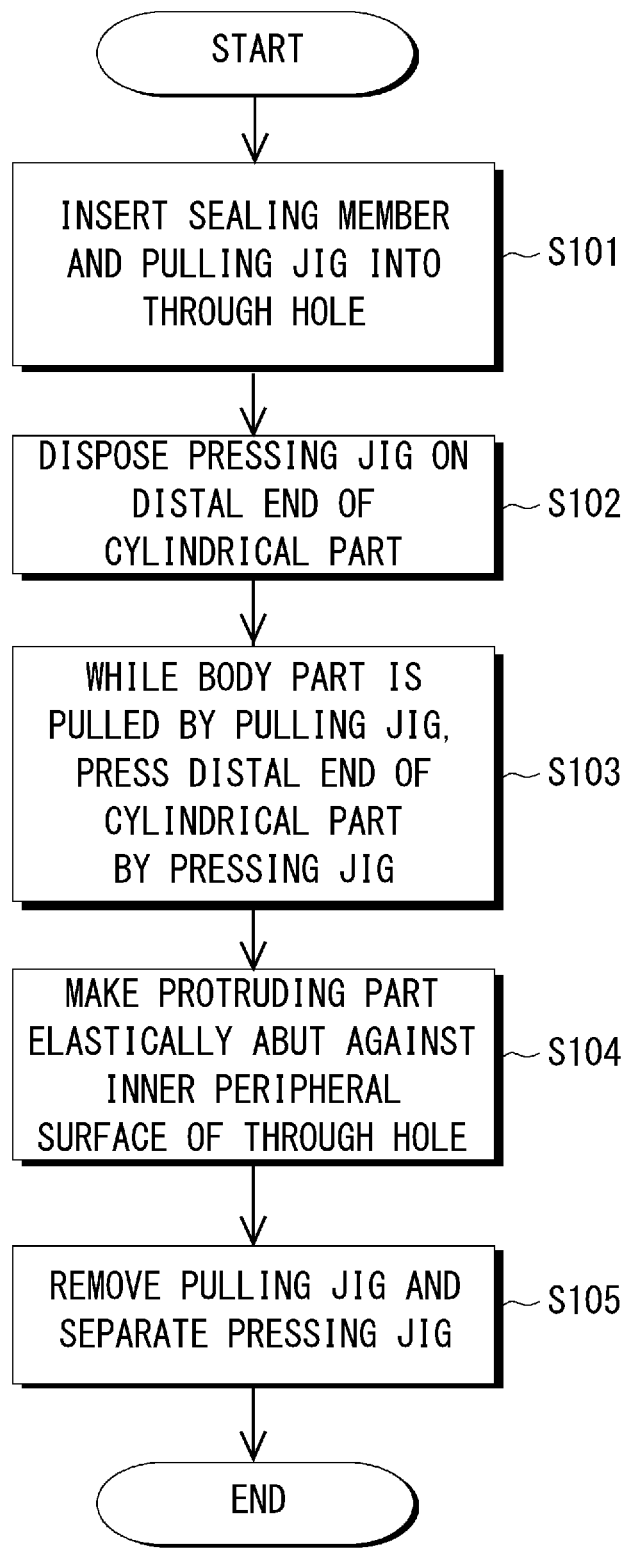
FIG. 3 is a flowchart showing a flow of a method of manufacturing the sealing structure according to the first embodiment.
Figure 4:
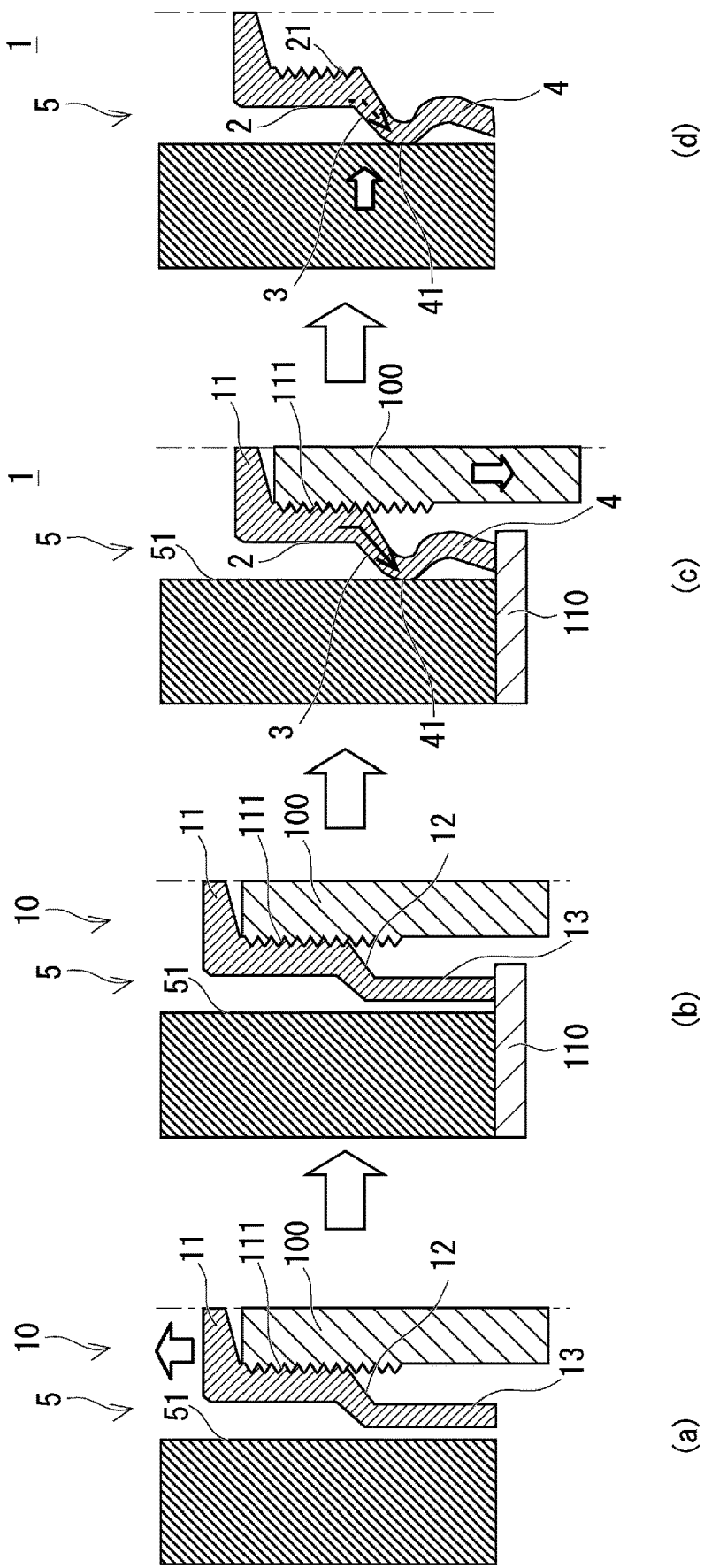
FIG. 4 is a view for explaining a manufacturing process of the sealing structure according to the first embodiment.

Next, a method of manufacturing the sealing structure according to the first embodiment will be described with reference to FIGS. 3 and 4. FIG. 3 is a flowchart showing a flow of the method of manufacturing the sealing structure according to the first embodiment. FIGS. 4A to 4D are views for explaining a manufacturing process of the sealing structure according to the first embodiment.

As shown in FIG. 4A, a sealing member 10 has a body part 11, a tapered part 12, and a cylindrical part 13. The body part 11 is a member having a cylindrical shape formed of a thin plate having a first thickness. One end of the cylindrical shape is open and the other end thereof is closed. One end of the tapered part 12 is connected to the opening side end of the body part 11. A diameter of the tapered part 12 gradually expands outward as a distance from the body part 11 increases. The cylindrical part 13 is connected to the other end of the tapered part 12. The cylindrical part 13 is a cylindrical member formed of a thin plate thinner than the first thickness.

First, as shown in FIG. 4A, male threads of a pulling jig 100 are screwed into female threads 111 of the inner peripheral surface of the body part 11 of the sealing member 10, and the sealing member 10 and the pulling jig 100 are inserted into the through hole 5 (Step S101).

As shown in FIG. 4B, a pressing jig 110 is disposed on a distal end side of the cylindrical part 13 in the through hole 5 (Step S102).

While the body part 11 is pulled by the pulling jig 100, a distal end of the cylindrical part 13 is pressed by the pressing jig 110 to buckle (plastically deform) the cylindrical part 13 outward (Step S103). As a result, as shown in FIG. 4C, the protruding part 41 protruding outward elastically abuts against the inner peripheral surface 51 of the through hole 5 (Step S104).

Since the cylindrical part 13 is formed of a thin plate thinner than the first thickness, by pressing the distal end of the cylindrical part 13 by the pressing jig 110 while pulling the body part 11 by the pulling jig 100, the cylindrical part 13 can be buckled as described above.

A recess or a projection may be formed on the inner peripheral surface of the body part 11 instead of the female threads 111. A pulling jig may be hooked on the recess or projection of the inner peripheral surface of the body part 11 and the body part 11 may be pulled as described above. In this manner, the body part 11 can be easily pulled, the cylindrical part 13 can be buckled outward, and the protruding part 41 can elastically abut against the inner peripheral surface 51 of the through hole 5.

By pressing the body part 11 from the opposite side of the opening, the cylindrical part 13 may be buckled outward and the protruding part 41 may elastically abut against the inner peripheral surface 51 of the through hole 5.

As shown in FIG. 4D, the pulling jig 100 is removed from the body part 2, and the pressing jig 110 is separated from a distal end of the first bent part 4 (Step S105).

When the pressing jig 110 is separated from the distal end of the first bent part 4, the sealing structure 1 is fixed in the through hole 5 by a force (hereinafter referred to as a spring back force) by which the protruding part 41 of the first bent part 4 elastically abuts against the inner peripheral surface 51 of the through hole 5. Further, by increasing the spring back force, it becomes more difficult for the sealing structure 1 to come out of the through hole 5.

Here, a method of adjusting the spring back force will be described. For example, the spring back force can be increased by adjusting the thickness and Young's modulus of the through hole 5 and the first bent part 4.

Figure 5:
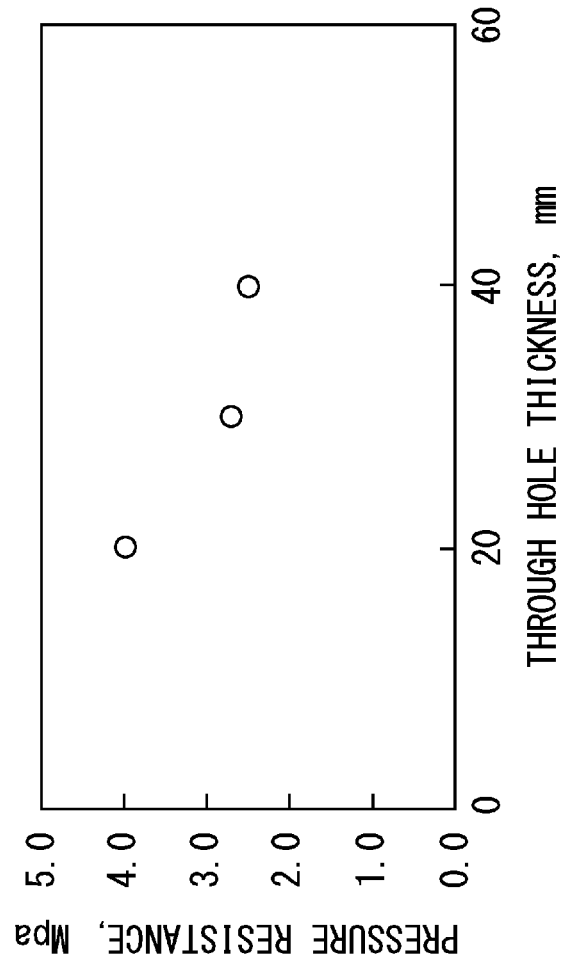
FIG. 5 shows results of verification of pressure resistances of the through hole.
Figure 5:
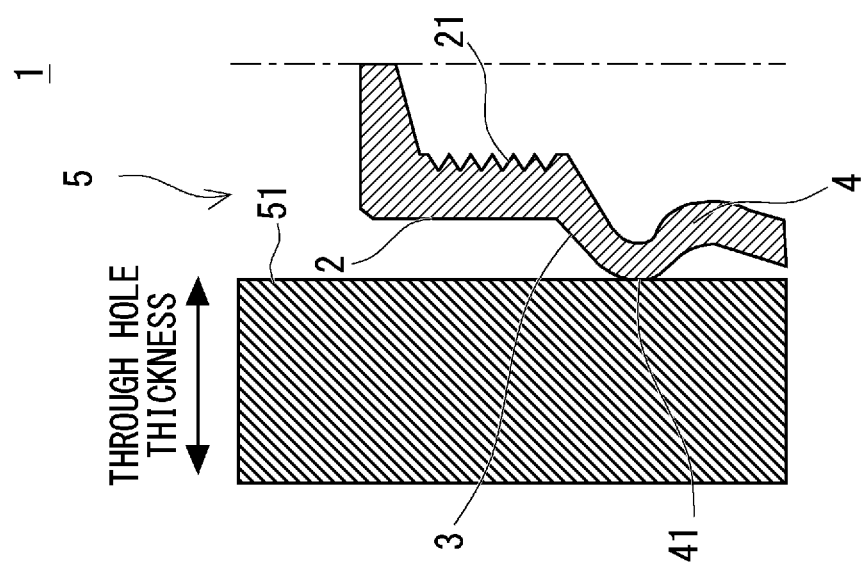

FIG. 5 shows results of verifying a pressure resistance of the through hole while changing a thickness of the through hole. According to the result of the pressure resistance verification shown in FIG. 5, the through hole 5 can be formed of an aluminum alloy (ADC 12: thermal expansion coefficient $21 \times 10^{-6}$), the thickness of the through hole 5 can be reduced, and the sealing structure 1 can be formed of stainless steel (SUS 410: thermal expansion coefficient $9.9 \times 10^{-6}$) which is hard to shrink. By doing so, the spring back force can be increased, and the sealing property of the sealing structure 1 can be improved. At low temperatures and room temperatures, the spring back force can be increased by the above adjustment. However, at high temperatures, an interference is reduced due to a difference between the thermal expansions of materials, so it is preferable to perform the adjustment so as to ensure the sealing property over the entire area.

As described above, the sealing structure 1 according to the first embodiment includes the body part 2 inserted into the through hole 5, formed of a thin plate of a first thickness, and including a cylindrical shape with one end open and another end closed, the tapered part 3 connected to the opened one end of the body part 2 and including a diameter gradually expanding outward as a distance from the body part 2 increases, and the first bent part 4 connected to the tapered part 3, formed of a thin plate thinner than the first thickness, and bent inward so that a protruding part 41 protruding outward elastically abuts against the inner peripheral surface 51 of the through hole 5. Thus, the protruding part 41 of the first bent part 4 elastically abuts against the inner peripheral surface 51 of the through hole 5 to prevent the sealing structure 1 from coming out of the through hole 5. Therefore, the sealing property of the through hole 5 can be sufficiently ensured.

Second Embodiment

Figure 6:
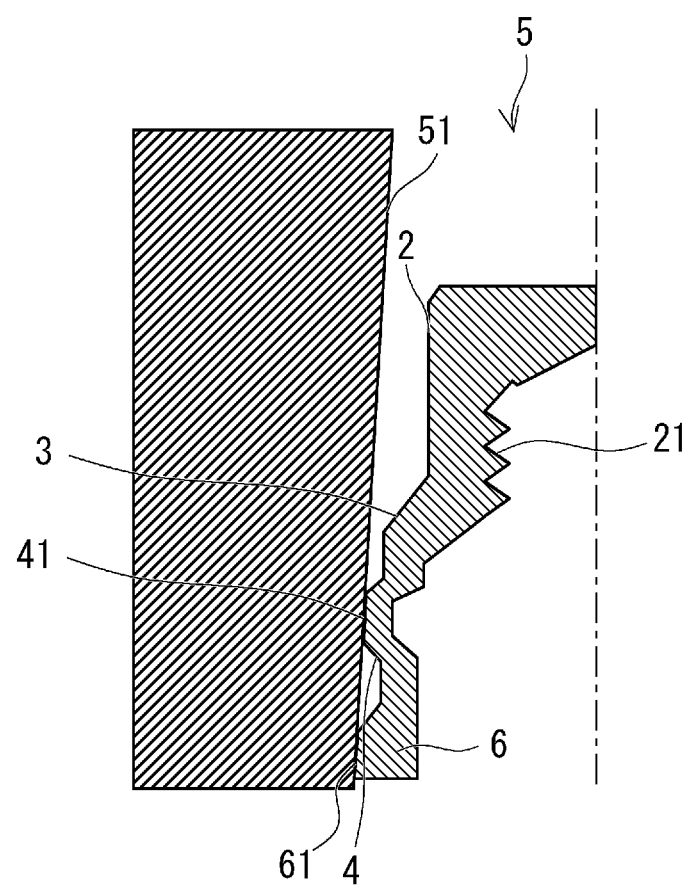
FIG. 6 is a cross-sectional view showing a configuration of a sealing structure according to a second embodiment.

FIG. 6 is a cross-sectional view showing a structure of the sealing structure according to a second embodiment. A sealing structure 20 according to the second embodiment is connected to the first bent part 4, formed of a thin plate thinner than the first thickness, and further includes a second bent part 6 which is bent outward so that a distal end part 61 elastically abuts against the inner peripheral surface 51 of the through hole 5. The first bent part 4 and the second bent part 6 are integrally formed.

According to the sealing structure 20 of the second embodiment, not only the protruding part 41 of the first bent part 4 but also the distal end part 61 of the second bent part 6 elastically abut against the inner peripheral surface 51 of the through hole 5. It is therefore possible to more surely prevent the sealing structure 20 from coming out of the through hole 5, thereby more sufficiently ensuring the sealing property of the through hole 5.

Figure 7:
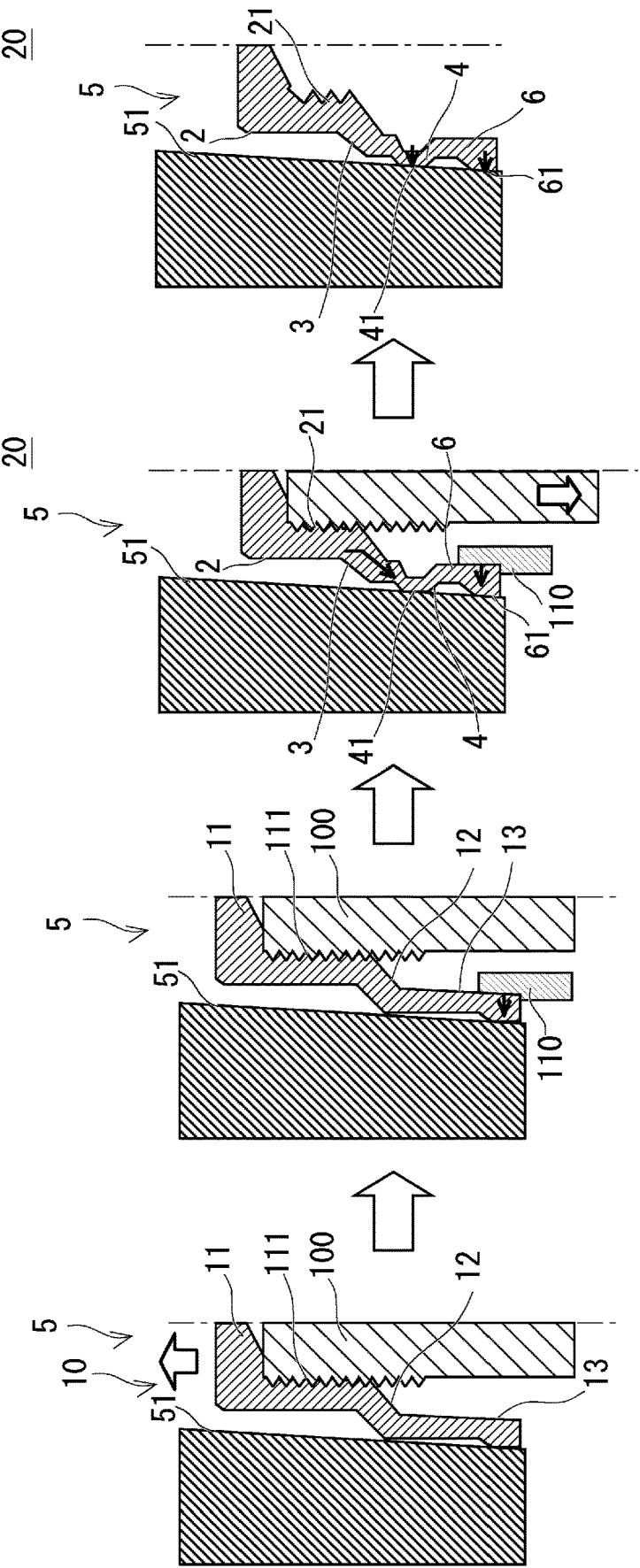
FIG. 7 is a view for explaining a method of manufacturing the sealing structure according to the second embodiment.

A method of manufacturing the sealing structure according to the second embodiment will now be described with reference to FIG. 7.

First, as shown in FIG. 7A, male threads of a pulling jig 100 are screwed into female threads 111 of the inner peripheral surface of the body part 11 of the sealing member 10, and the sealing member 10 and the pulling jig 100 are inserted into the through hole 5. In this way, the sealing member 10 can be inserted into the through hole 5 together with the pulling jig 100 and can be easily positioned, thereby improving workability.

As shown in FIG. 7B, the distal end of the cylindrical part 13 is pressed against the inner peripheral surface 51 of the through hole 5 by the pressing jig 110.

Note that the body part 11 of the sealing member 10 may be inserted into the through hole 5, and after the distal end of the cylindrical part 13 is pressed and fixed to the inner peripheral surface 51 of the through hole 5 by the pressing jig 110, the male threads of the pulling jig 100 may be screwed into the female threads 111 of the inner peripheral surface of the body part 11.

As shown in FIG. 7C, while the body part 11 is pulled by the pulling jig 100, the distal end of the cylindrical part 13 is pressed by the pressing jig 110, so that the cylindrical part 13 can be buckled outward, the protruding part 41 of the first bending part 4 protruding outward can elastically abut against the inner peripheral surface 51 of the through hole 5, and the distal end of the first bent part 4 can be bent outward to form the second bent part 6.

Since the cylindrical part 13 is formed of a thin plate thinner than the first thickness, by pressing the distal end of the cylindrical part 13 by the pressing jig 110 while pulling the body part 2 by the pulling jig 100, the cylindrical part 13 is buckled and the first bent part 4 can be formed as described above. Further, since the distal end of the cylindrical part 13 is pressed against the inner peripheral surface 51 of the through hole 5 by the pressing jig 110, the distal end of the first bent part 4 can be bent outward to form the second bent part 6.

As shown in FIG. 7D, the pulling jig 100 is removed from the body part 2, and the pressing jig 110 is separated from a distal end 61 of the second bent part 6.

In the second embodiment, the thickness of the distal end part 61 of the second bent part 6 may be made greater than the thickness of the protruding part 41 of the first bent part 4. The distal end part 61 of the second bent part 6 may be tapered so that its diameter expands outward.

Thus, by pressing the distal end part of the thick or tapered cylindrical part 13 by the pressing jig 110 and shortening the bendable part, the spring back force of the first and second bent parts 4 and 6 can be increased.

Figure 8:
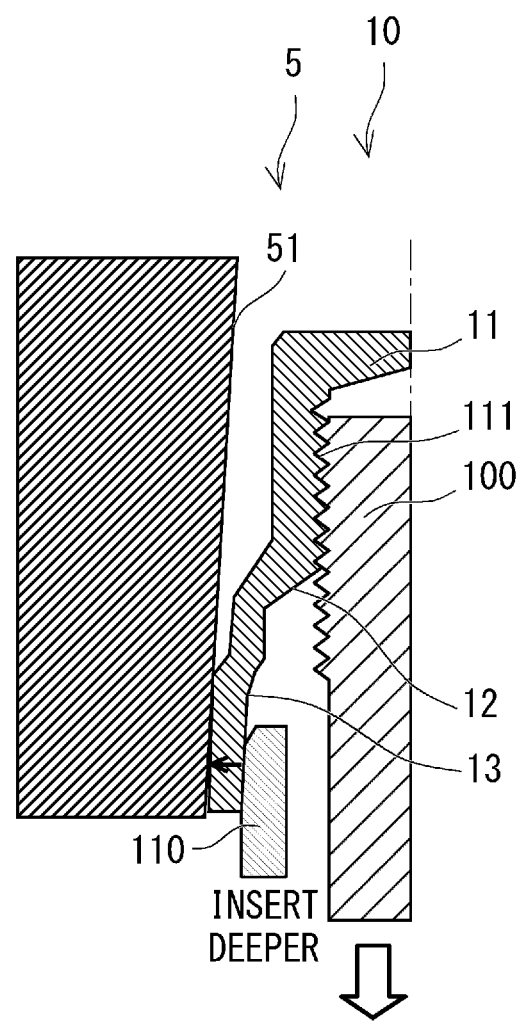
FIG. 8 is a view showing a pressing jig inserted at a deeper level in a cylindrical part.

In the second embodiment, as shown in FIG. 8, the pressing jig 110 may be inserted into the cylindrical part 13 at a deeper level, and the distal end of the cylindrical part 13 may be pressed by the pressing jig 110. In this case, while the body part 11 is pulled by the pulling jig 100, the distal end of the cylindrical part 13 is pressed by the pressing jig 110, so that the cylindrical part 13 is buckled outward, the protruding part 41 of the first bending part 4 protruding outward can more strongly abut against the inner peripheral surface 51 of the through hole 5, and the distal end of the first bent part 4 can abut against the inner peripheral surface 51 of the through hole 5.

Figure 9:
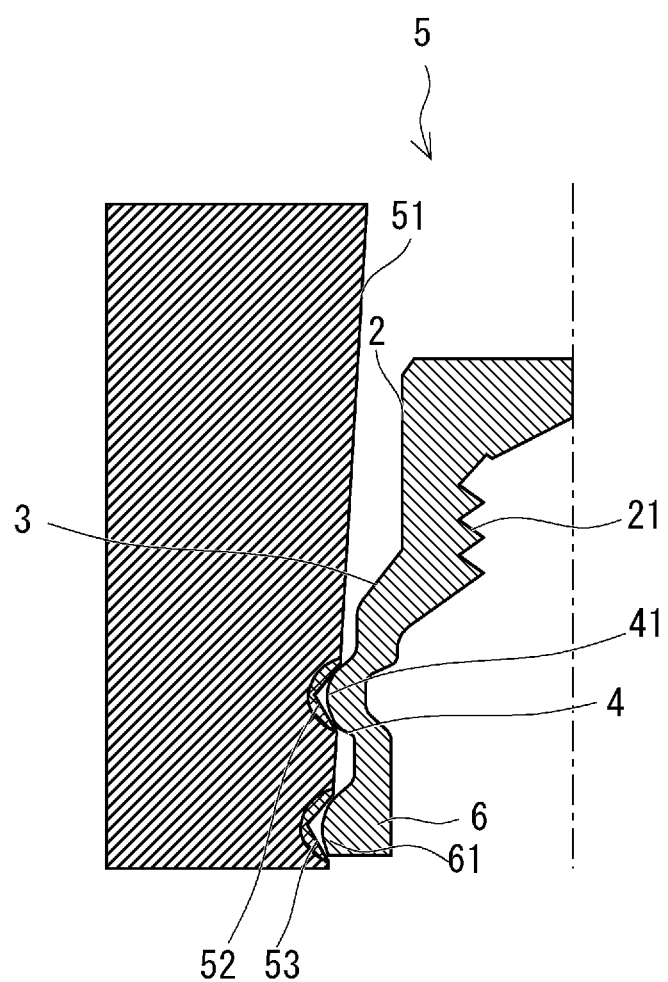
FIG. 9 shows a notch formed on an inner peripheral surface of a through hole.

In the second embodiment, as shown in FIG. 9, on the inner peripheral surface 51 of the through hole 5, a notch 52 may be formed at a part where the protruding part 41 of the first bent part 4 abuts, and a notch 53 may be formed at a part where the distal end part 61 of the second bent part 6 abuts. Thus, the sealing structure can be more surely prevented from coming out of the through hole 5.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A sealing structure for sealing a through hole of a predetermined member, the sealing structure comprising:
   a cylindrically-shaped body part inserted into the through hole, formed of a thin plate of a first thickness, one end of the body part being open and another end of the body part being closed;
   a tapered part connected to the opened one end of the body part and including a diameter gradually expanding outward as a distance from the body part increases;
   a first bent part connected to the tapered part, formed of a thin plate thinner than the first thickness, and bent inward so that a protruding part protruding outward elastically abuts against an inner peripheral surface of the through hole; and
   a second bent part connected to the first bent part, formed of a thin plate thinner than the first thickness, and bent outward so that a distal end part elastically abuts against the inner peripheral surface of the through hole.

2. The sealing structure according to claim 1, wherein
   a recessed notch is formed on the inner peripheral surface of the through hole, and
   at least one of the protruding part of the first bent part and the distal end part of the second bent part is fitted into the notch.

3. The sealing structure according to claim 1, wherein
   a thickness of the distal end part of the second bent part is greater than a thickness of the protruding part of the first bent part, or
   the distal end part of the second bent part is tapered so that its diameter expands outward.

4. The sealing structure according to claim 1, wherein
   female threads engaged with male threads formed in a pulling jig for pulling the body part in an axial direction are formed on the inner peripheral surface of the body part.

5. A method of manufacturing a sealing structure for sealing a through hole of a predetermined member, the method comprising:
   inserting a sealing member into the through hole, the sealing member including a cylindrically-shaped body part formed of a thin plate of a first thickness, one end of the body part being open and another end of the body part being closed, a tapered part with one end connected to the opened one end of the body part and including a diameter gradually expanding outward as a distance from the body part increases, and a cylindrical part connected to another end of the tapered part and including a cylindrical shape formed of a thin plate thinner than the first thickness;

disposing a pressing jig on a distal end of the cylindrical part in the through hole; and pressing a distal end of the cylindrical part by the pressing jig while pressing or pulling the body part toward the cylindrical part to thereby buckle the cylindrical part outward and make a first bent part connected to the tapered part, formed of a thin plate thinner than the first thickness, so that a protruding part protruding outward elastically abuts against an inner peripheral surface of the through hole, the pressing jig is disposed so that the distal end of the cylindrical part is pressed against the inner peripheral surface of the through hole by the pressing jig, and by pressing or pulling the body part toward the cylindrical part, the cylindrical part is buckled outward, and the protruding part of the first bent part protruding outward elastically abuts against the inner peripheral surface of the through hole, and a distal end side of the first bent part is bent outward to form a second bent part that elastically abuts against the inner peripheral surface of the through hole and, wherein the second bent part is formed of a thin plate thinner than the first thickness.

6. The method according to claim 5, wherein the distal end of the cylindrical part is pressed by pressing or pulling the body part toward the cylindrical part and making the distal end of the cylindrical part abut against the pressing jig.

7. The method according to claim 5, wherein male threads of a pulling jig are screwed into female threads formed on the inner peripheral surface of the body part, or the pulling jig is hooked on a recess or projection formed on the inner peripheral surface of the body part, and by pressing the distal end of the cylindrical part by the pressing jig while pulling the pulling jig, the cylindrical part is buckled outward and the protruding part protruding outward elastically abuts against the inner peripheral surface of the through hole.

* * * * *